(12) United States Patent
Duknic

(10) Patent No.: US 12,420,426 B2
(45) Date of Patent: Sep. 23, 2025

(54) ACTIVE HOSTILE THREAT COMMUNICATION DEVICE

(71) Applicant: Dimitri Duknic, Quinte West (CA)

(72) Inventor: Dimitri Duknic, Quinte West (CA)

( * ) Notice: Subject to any disclaimer, the term of this patent is extended or adjusted under 35 U.S.C. 154(b) by 152 days.

(21) Appl. No.: 18/386,413

(22) Filed: Nov. 2, 2023

(65) Prior Publication Data

US 2025/0144810 A1    May 8, 2025

(51) Int. Cl.
| | |
|---|---|
| *B25J 11/00* | (2006.01) |
| *B25J 9/00* | (2006.01) |
| *B25J 9/16* | (2006.01) |
| *B25J 15/00* | (2006.01) |
| *B25J 19/00* | (2006.01) |
| *B25J 19/02* | (2006.01) |

(52) U.S. Cl.
CPC ........... *B25J 11/002* (2013.01); *B25J 9/0009* (2013.01); *B25J 9/162* (2013.01); *B25J 9/1689* (2013.01); *B25J 11/0005* (2013.01); *B25J 15/0028* (2013.01); *B25J 19/005* (2013.01); *B25J 19/023* (2013.01)

(58) Field of Classification Search
CPC ........ B25J 11/002; B25J 9/0009; B25J 9/162; B25J 9/1689; B25J 11/0005; B25J 15/0028; B25J 19/005; B25J 19/023
See application file for complete search history.

(56) References Cited

U.S. PATENT DOCUMENTS

| | | | |
|---|---|---|---|
| 6,113,343 A | 9/2000 | Goldenberg | |
| 6,889,118 B2 * | 5/2005 | Murray, IV | G05D 1/0088 318/568.13 |
| 7,171,286 B2 * | 1/2007 | Wang | G16H 40/67 600/595 |
| 7,292,912 B2 * | 11/2007 | Wang | H04N 7/185 700/262 |
| 7,896,113 B1 | 3/2011 | Ramirez | |
| 8,973,671 B2 | 3/2015 | Alsaif | |
| 10,101,134 B2 | 10/2018 | Chavez | |
| D916,203 S | 4/2021 | Wang | |
| 11,340,620 B2 | 5/2022 | Seifert | |

(Continued)

FOREIGN PATENT DOCUMENTS

CA    2519754    4/2006

OTHER PUBLICATIONS

Alpolloni et al., Long distance telerobotics in hostile environment, 2000, IEEE, p. 152-157 (Year: 2000).*

(Continued)

*Primary Examiner* — McDieunel Marc

(57) ABSTRACT

An active hostile threat communication device includes a drive unit that is in remote communication with a remote control for remotely control by an operator. A mannequin is movably disposed on the drive unit which can be driven to an active hostile threat. A plurality of actuators is coupled between the drive unit and the mannequin for urging the mannequin into an upright position or a prone position. A robotic arm is movably integrated into the mannequin which can move in a wide range of motions to manipulate objects. A stretcher is removably coupled to the mannequin which can be employed for transporting an injured person. The stretcher is comprised of a bullet resistant material for employing as a ballistic shield.

13 Claims, 9 Drawing Sheets

(56) References Cited

U.S. PATENT DOCUMENTS

| 12,226,913 B2* | 2/2025 | Mandlekar | B25J 9/1682 |
|---|---|---|---|
| 2003/0026588 A1* | 2/2003 | Elder | H04N 7/18 |
| | | | 386/230 |
| 2006/0070558 A1 | 4/2006 | Chiu | |
| 2018/0222059 A1 | 8/2018 | Ragula | |

OTHER PUBLICATIONS

Katyal et al., Approaches to robotic teleoperation in a disaster scenario: From supervised autonomy to direct control, 2014, IEEE, p. 1874-181881 (Year: 2014).*

Park et al., Design and preliminary evaluation of a multi-robotic system with pelvic and hip assistance for pediatric gait rehabilitation, 2017, IEEE, p. 332-339 (Year: 2017).*

Teller et al., A voice-commandable robotic forklift working alongside humans in minimally-prepared outdoor environments, 2010, IEEE, p. 526-533 (Year: 2010).*

* cited by examiner

ACTIVE HOSTILE THREAT COMMUNICATION DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to communication devices and more particularly pertains to a new communication device for facilitating an operator to remotely negotiate with an active hostile threat. The device includes a mannequin that is movably attached to a drive unit that is remotely controlled by an operator. The mannequin includes a sound unit to facilitate the operator to verbally communicate with the active hostile threat. Additionally, a stretcher is the mannequin for carrying an injured individual.

(2) Description of Related Art Including Information Disclosed Under 37 CFR 1.97 and 1.98

The prior art relates to communication devices including wheeled robot with a robotic arm for explosive ordinance disposal and a variety of tracked robots that have cameras for surveillance and a wheeled robot which has a non-lethal weapon. In no instance does the prior art disclose a remotely controlled mannequin that is mounted to a track drive and which has a stretcher for transporting an injured individual.

BRIEF SUMMARY OF THE INVENTION

An embodiment of the disclosure meets the needs presented above by generally comprising a drive unit that is in remote communication with a remote control for remotely control by an operator. A mannequin is movably disposed on the drive unit which can be driven to an active hostile threat. A plurality of actuators is coupled between the drive unit and the mannequin for urging the mannequin into an upright position or a prone position. A robotic arm is movably integrated into the mannequin which can move in a wide range of motions to manipulate objects. A stretcher is removably coupled to the mannequin which can be employed for transporting an injured person. The stretcher is comprised of a bullet resistant material for employing as a ballistic shield.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
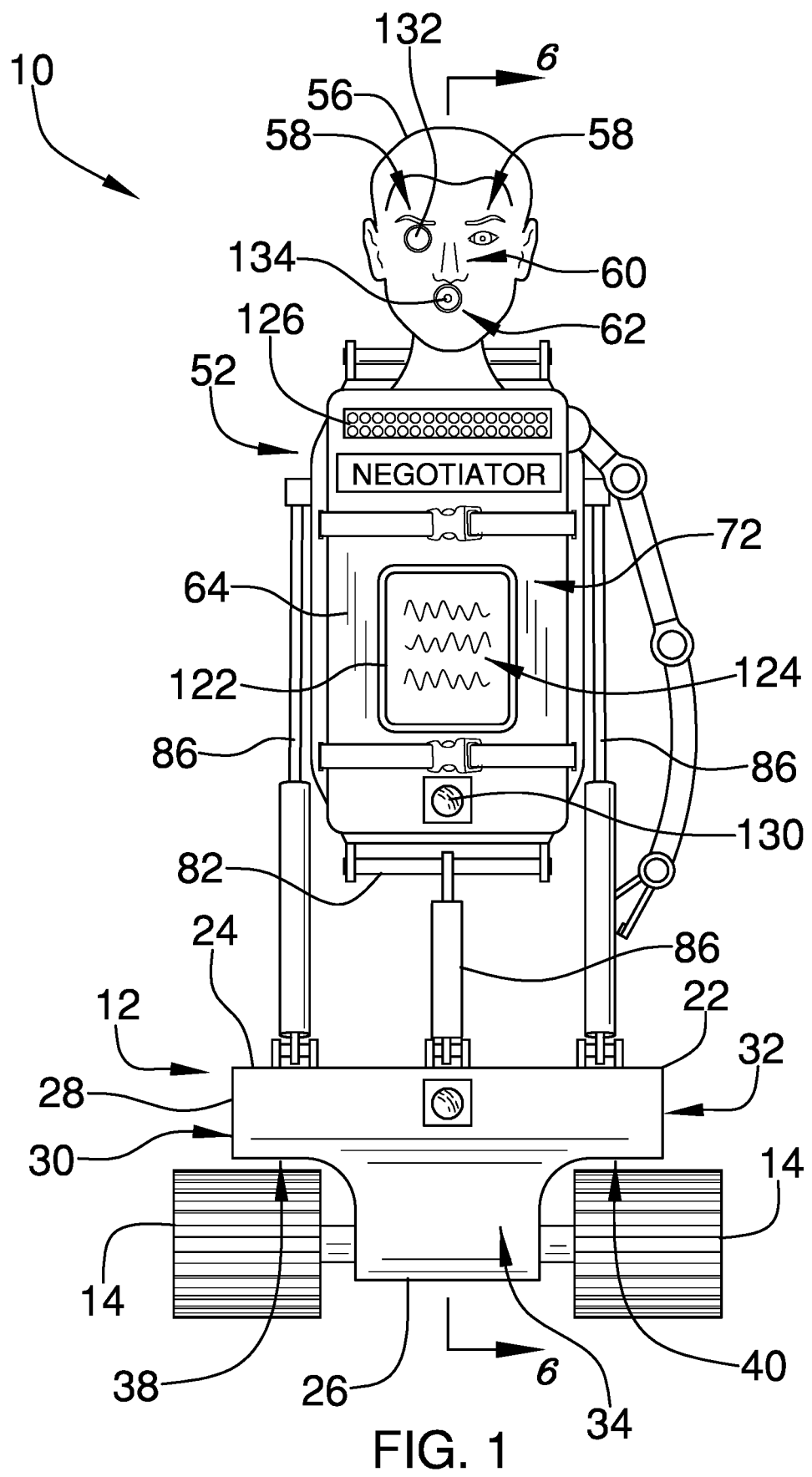
FIG. 1 is a front view of an active hostile threat communication device according to an embodiment of the disclosure.
Figure 2:
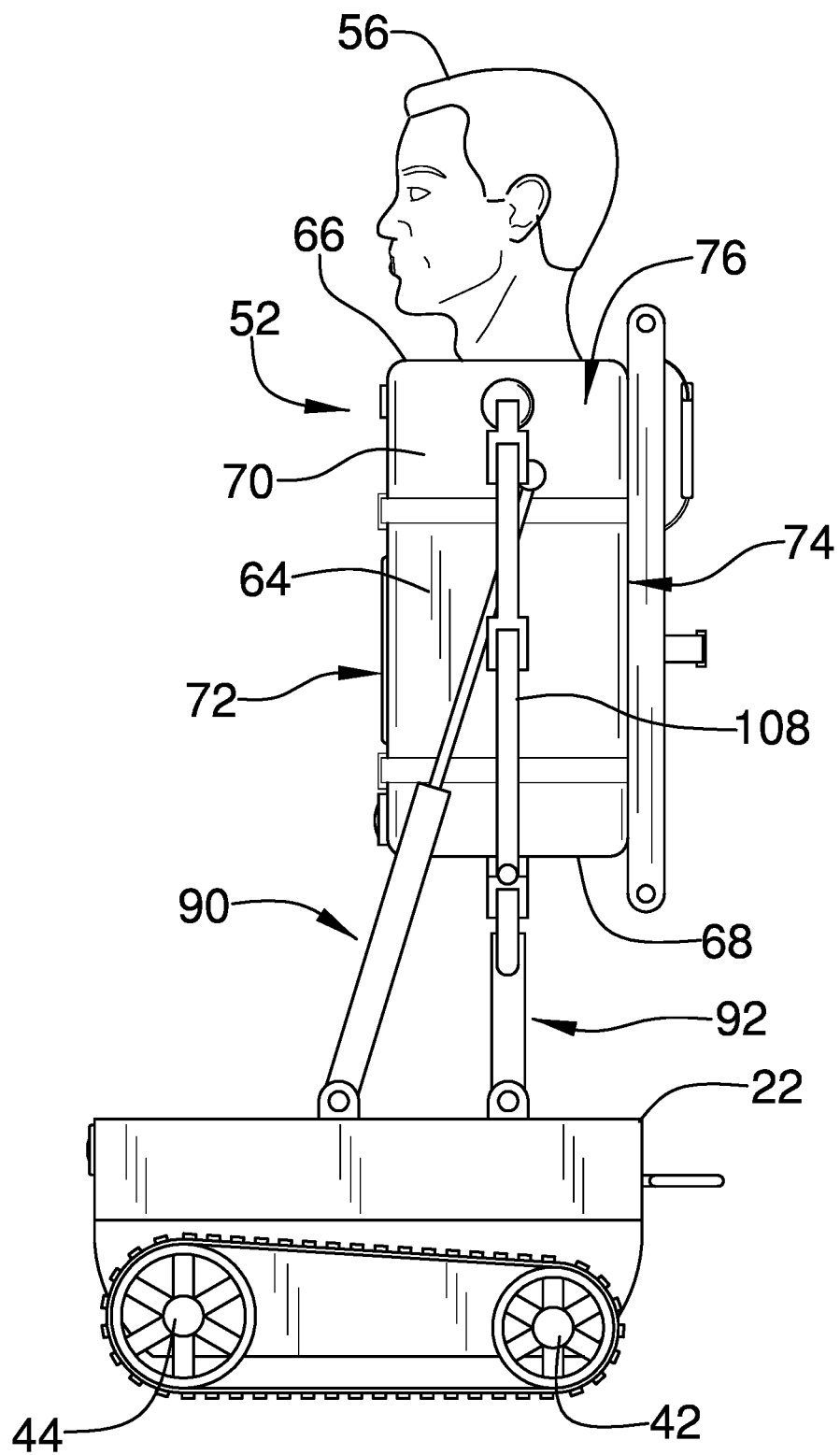
FIG. 2 is a left side view of an embodiment of the disclosure.
Figure 3:
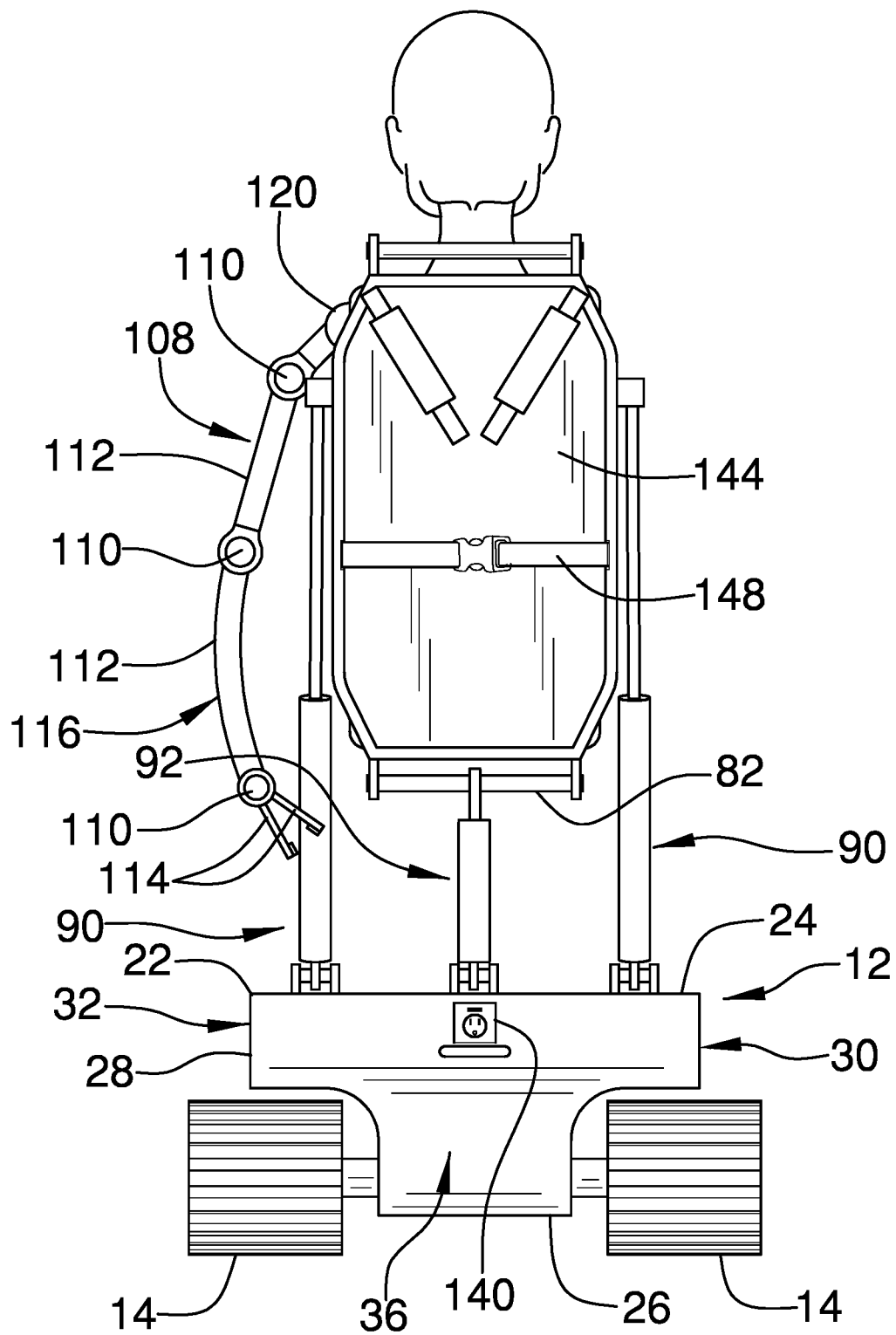
FIG. 3 is a back view of an embodiment of the disclosure.
Figure 4:
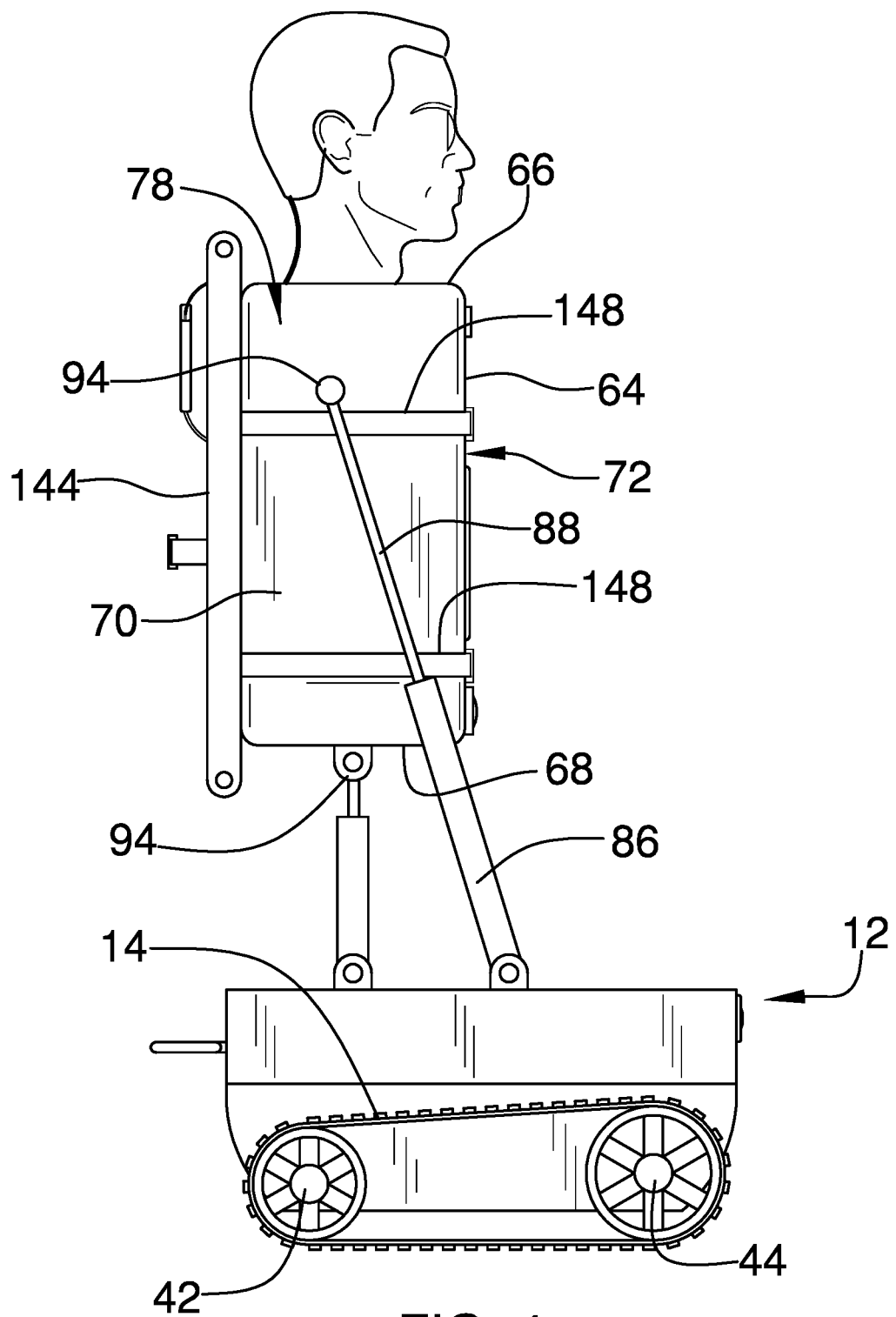
FIG. 4 is a right view of an embodiment of the disclosure showing a mannequin in an upright position.
Figure 5:
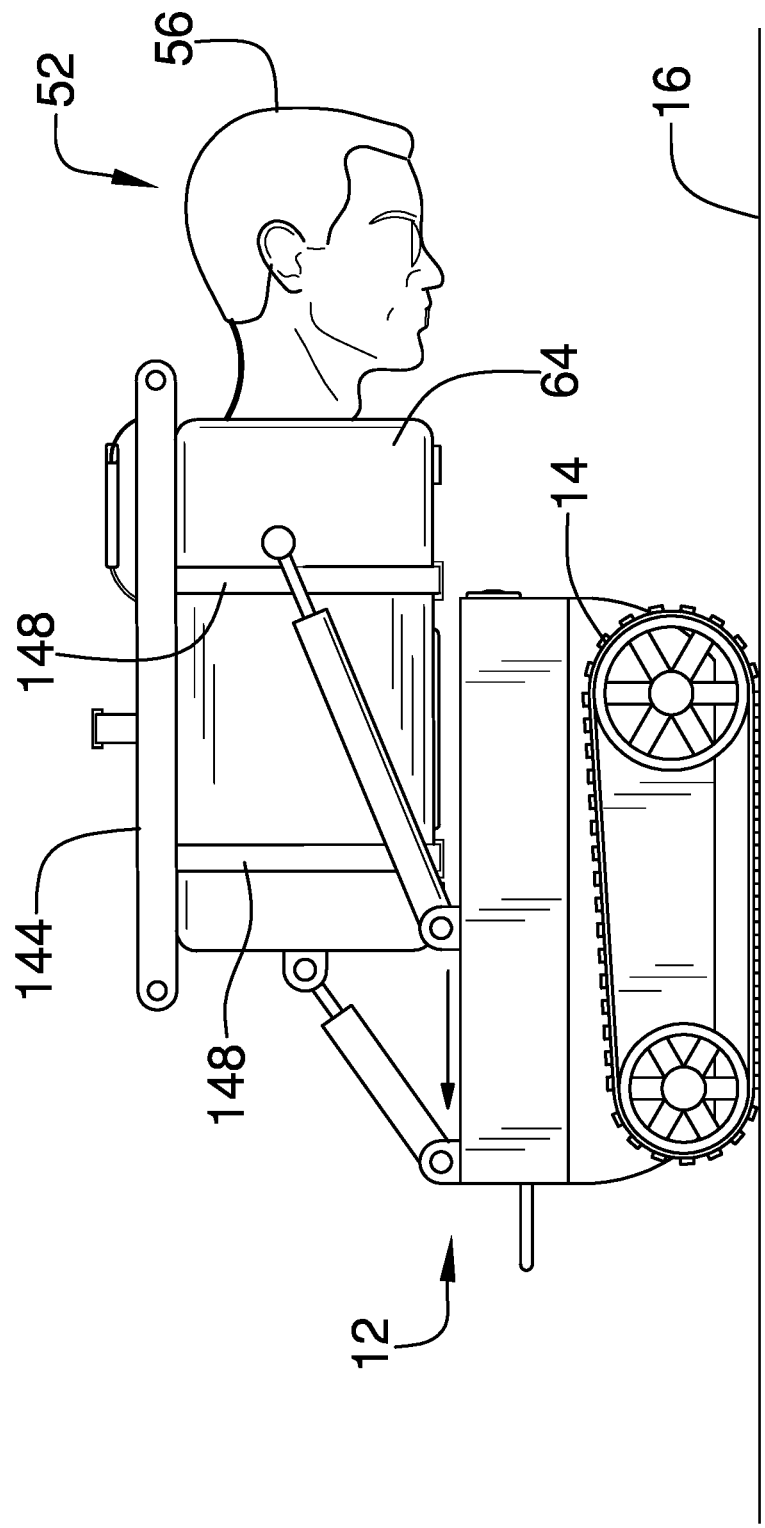
FIG. 5 is a right side view of an embodiment of the disclosure showing a mannequin in a prone position.

With reference now to the drawings, and in particular to FIGS. 1 through 9 thereof, a new communication device embodying the principles and concepts of an embodiment of the disclosure and generally designated by the reference numeral 10 will be described.

As best illustrated in FIGS. 1 through 9, the active hostile threat communication device 10 generally comprises a drive unit 12 has a pair of tracks 14 that can each urge the drive unit 12 along a support surface 16, which may be any type of terrain, a floor or other type of horizontal support surface 16. The drive unit 12 is in remote communication with a remote control 18 such that the drive unit 12 can be remotely controlled by an operator 20. The operator 20 may be a member of law enforcement, a member of the military or other individual that specializes in dealing with active hostile threats or hostage situations. An active hostile threat may be an individual or multiple persons possessing or controlling a weapon, explosive, or other device creating an immediate hostile or dangerous situation. The drive unit 12 comprises a housing 22 which has a top wall 24, a bottom wall 26 and an outer wall 28 extending between the top wall 24 and the bottom wall 26. The outer wall 28 has a first lateral side 30, a second lateral side 32, a front side 34 and a back side 36. The first lateral side 30 has a first recess 38 extending toward the second lateral side 32 and the second lateral side 32 has a second recess 40 extending toward the first lateral side 30. The first recess 38 extends between the front side 34 and the back side 36 and the first recess 38 is aligned with the bottom wall 26. The second recess 40 extends between the front side 34 and the back side 36 and the second recess 40 is aligned with the bottom wall 26.

The drive unit 12 includes a pair of drive wheels 42 and each of the drive wheels 42 is rotatably attached to a respective one of the first lateral side 30 and the second lateral side 32 of the outer wall 28 of the housing 22. Additionally, each of the drive wheels 42 is positioned in a respective one of the first recess 38 and the second recess 40 at a point located adjacent to the back side 36 of the outer wall 28. The drive unit 12 includes a pair of free wheels 44 and each of the free wheels 44 is rotatably coupled to a respective one of the first lateral side 30 and the second lateral side 32 of the outer wall 28 of the housing 22. Each of the free wheels 44 is positioned in a respective one of the first recess 38 and the second recess 40 at a point located adjacent to the front side 34 of the outer wall 28. Additionally, each of the pair of tracks 14 extends around a respective one of the drive wheels 42 and a respective one of the free wheels 44.

The drive unit 12 includes a processor 46 that is integrated into the housing 22 and a transceiver 48 that is integrated into the housing 22. The transceiver 48 is electrically coupled to the processor 46 and the transceiver 48 is in wireless communication with the remote control 18 thereby facilitating the transceiver 48 to receive command signals from the remote control 18. The transceiver 48 may comprise a radio frequency transceiver or the like and the transceiver 48 may have an operational range of at least 100.0 meters. The drive unit 12 includes a pair of drive motors 50 and each of the pair of drive motors 50 is positioned within the housing 22. Each of the pair of drive motors 50 is in mechanical communication with a respective one of the drive wheels 42. Furthermore, each of the pair of drive motors 50 is actuatable to rotate in a first direction or a second direction thereby rotating the respective drive wheel 42 in a forward direction or a rearward direction to facilitate the pair of tracks 14 to urge the housing 22 along the support surface 16. Each of pair of the drive motors 50 is electrically coupled to the processor 46 to facilitate the operator 20 to remotely control the motion of the drive unit 12.

A mannequin 52 is movably disposed on the drive unit 12 wherein the mannequin 52 is configured to be driven to an active hostile threat 54. The mannequin 52 has a head 56 which is structured to have a pair of eyes 58, a nose 60 and a mouth 62 such that the head 56 has a human appearance. The mannequin 52 includes a torso box 64 that has an upper wall 66, a lower wall 68 and an outside wall 70 extending between the upper wall 66 and the lower wall 68 and the outside wall 70 has a forward side 72, a rear side 74, a first sidelong side 76 and a second sidelong side 78. Additionally, a neck 80 of the head 56 is attached to the upper wall 66 of the torso box 64. A bar 82 is attached to the lower wall 68 of the torso box 64 and the bar 82 is oriented to extend substantially between the first sidelong side 76 and the second sidelong side 78 of the torso box 64.

A plurality of actuators 84 is each coupled between the drive unit 12 and the mannequin 52 for supporting the mannequin 52 above the drive unit 12. The plurality of actuators 84 urges the mannequin 52 into an upright position having the mannequin 52 being vertically oriented on the drive unit 12. Conversely, the plurality of actuators 84 urges the mannequin 52 into a prone position having the mannequin 52 being horizontally oriented on the drive unit 12. Each of the plurality of actuators 84 includes a cylinder 86 that is pivotally attached to the top wall 24 of the housing 22 associated with the drive unit 12. Additionally, each of the actuators 84 includes a piston 88 that is slidably integrated into the cylinder 86 and the piston 88 associated with each of the actuators 84 is urgeable to retract or extend from the cylinder 86 associated with a respective actuator 84. Furthermore, each of the plurality of actuators 84 may comprise a hydraulic actuator or an electromechanical linear actuator.

The plurality of actuators 84 includes a pair of side actuators 90 and a central actuator 92. A free end 94 of the piston 88 associated with each of the side actuators 90 is pivotally attached to a respective one of the first sidelong side 76 and the second sidelong side 78 of the outside wall 70 of the torso box 64 at a point located closer to the upper wall 66 than the lower wall 68 of the torso box 64. A free end 94 of the piston 88 associated with the central actuator 92 is pivotally coupled to bar 82 on the lower wall 68 of the torso box 64. The forward side 72 of the outside wall 70 of the torso box 64 is spaced from and lies on a plane that is oriented parallel to the top side of the outer wall 28 of the housing 22 associated with the drive unit 12 when the plurality of actuators 84 urges the mannequin 52 into the prone position. Conversely, the lower wall 68 of the torso box 64 is spaced from and lies on a plane that is oriented parallel to the top wall 24 of the housing 22 associated with the drive unit 12 when the plurality of actuators 84 urges the mannequin 52 into the upright position.

Figure 6:
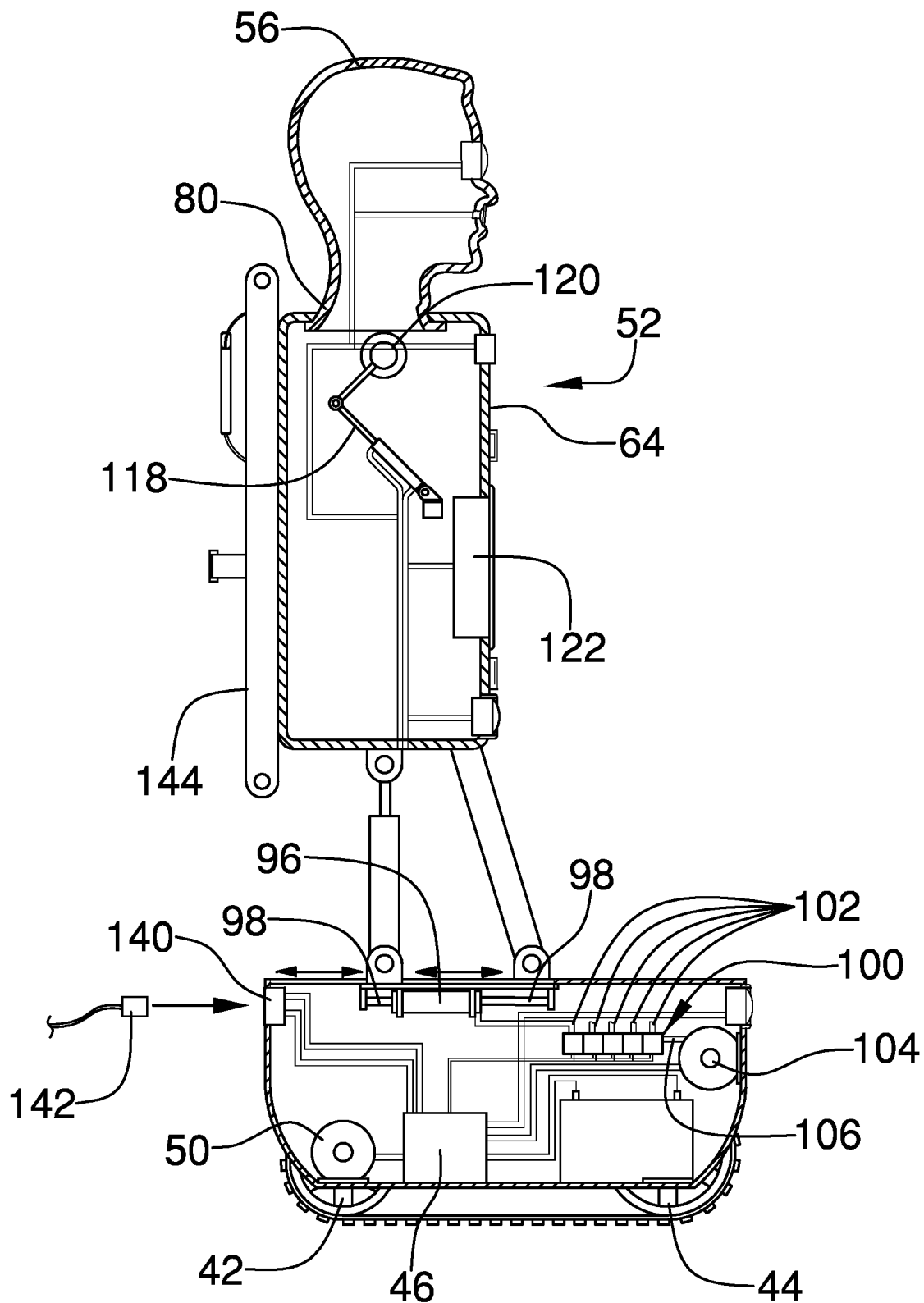
FIG. 6 is a cross sectional view taken along line 6-6 of FIG. 1 of an embodiment of the disclosure.
Figure 7:
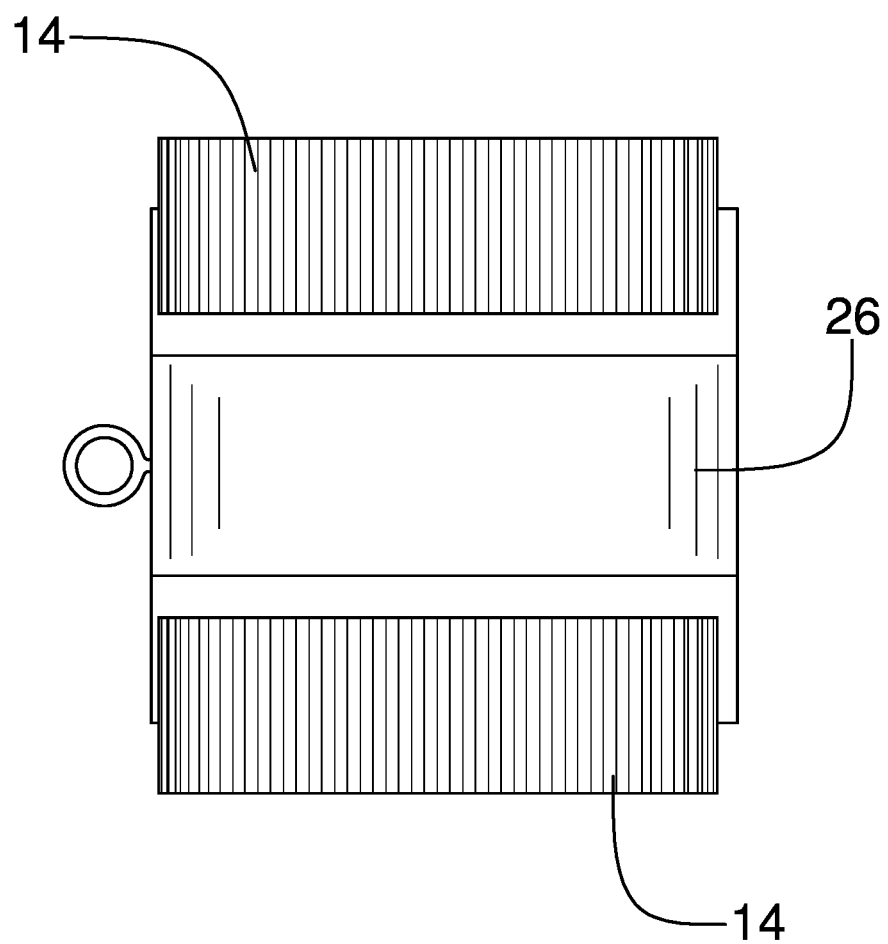
FIG. 7 is a bottom view of an embodiment of the disclosure.
Figure 8:
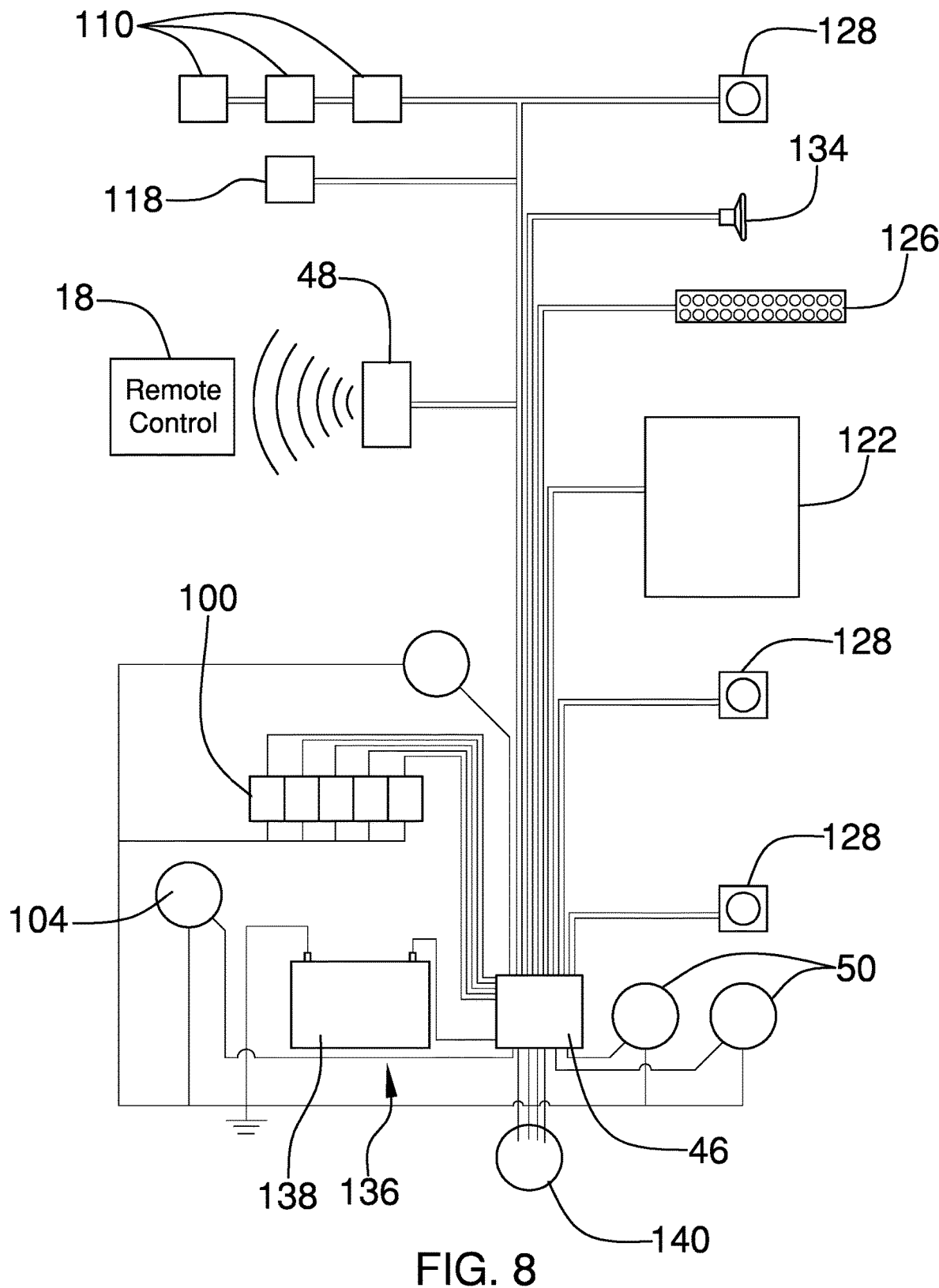
FIG. 8 is a schematic view of an embodiment of the disclosure.
Figure 9:
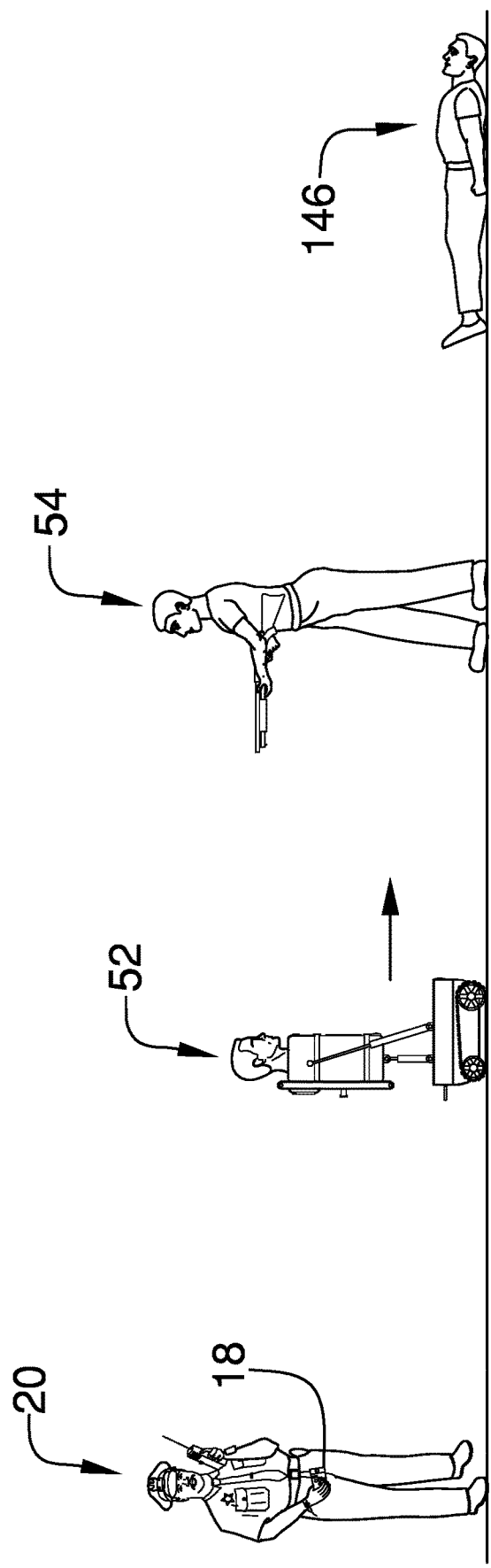
FIG. 9 is a perspective in-use view of an embodiment of the disclosure.

As is most clearly shown in FIG. 6, a slide unit 96 may be integrated into the housing 22 associated with the drive unit 12 and the cylinder 86 associated with each of the actuators 84 may be attached to the slide unit 96. The slide unit 96 might comprise a linear actuator that has a pair of arms 98 each extending in opposing directions from each other. The central actuator 92 may be coupled to a respective one of the arms 98 and each of the pair of side actuators 90 may be coupled to an opposing one of the arms 98. In this way the slide unit 96 can slide the plurality of actuators 84 back and forth on the housing 22 associated with the drive unit 12.

A hydraulic manifold 100 is positioned within the housing 22 associated with the drive unit 12 and the hydraulic manifold 100 has a plurality of outputs 102. Each of the outputs 102 is fluidly coupled to the cylinder 86 associated with a respective one of the plurality of actuators 84. Additionally, the hydraulic manifold 100 is electrically coupled to the processor 46 for receiving instructional commands relating to either extending or retracting each of the plurality of actuators 84. The hydraulic manifold 100 may comprise an electronically controlled hydraulic manifold or the like which includes fluid valves for controlling the flow of hydraulic fluid through each of the plurality of outputs 102.

A hydraulic pump 104 is positioned within the housing 22 associated with the drive unit 12. The hydraulic pump 104 is fluidly coupled to an input 106 of the hydraulic manifold 100 for supplying hydraulic pressure to the hydraulic manifold 100. Additionally, the hydraulic pump 104 is electrically coupled to the processor 46 for receiving instructional commands relating to supplying hydraulic pressure to the hydraulic manifold 100. The hydraulic pump 104 may comprise an electrically driven hydraulic pump of any conventional design.

A robotic arm 108 is movably integrated into the mannequin 52 and the robotic arm 108 is actuatable to move in a wide range of motions to manipulate objects. The robotic arm 108 includes a series of arm actuators 110 that is each integrated into a respective one of a plurality of segments 112 of the robotic arm 108 thereby facilitating the plurality of segments 112 to move independently of each other. Additionally, the robotic arm 108 includes pair of jaws 114 that is each pivotally disposed on a distal one of the plurality of segments 116. The jaws 114 are movable toward or away from each other to either grip or release the objects.

The robotic arm 108 includes a shoulder actuator 118 that is positioned within the torso box 64. Additionally, the shoulder actuator 118 is in mechanical communication with a shoulder 120 of the robotic arm 108 for rotating the shoulder 120. Each of the series of arm actuators 110 is electrically coupled to the processor 46 for receiving instructional commands from the processor 46 with respect to motion of the robotic arm 108. Additionally, the shoulder actuator 118 is electrically coupled to the processor 46 for receiving instructional commands from the processor 46 with respect to motion of the shoulder 120. Each of the plurality of arm actuators 110 may comprise electronic servos that are commonly associated with robotics and the shoulder actuator 118 may include a ball that is driven by a piston thereby facilitating the shoulder 120 of the robotic arm 108 to be rotated 360.0 degrees on the torso box 64.

A display 122 is integrated into the mannequin 52 such that the display 122 is visible to the active hostile threat 54 when the mannequin 52 is driven to the active hostile threat 54. The display 122 displays indicia 124 comprising words and letters defining written instructions. In this way the active hostile threat 54 might be able to read the instructions when the mannequin 52 approaches the active hostile threat 54. The display 122 is electrically coupled to the processor 46 and the display 122 is positioned on the forward side 72 of the outside wall 70 of the torso box 64. Additionally, the display 122 may comprise a liquid crystal display or other type of electronic display.

A light 126 is integrated into the mannequin 52 to emit a high intensity light outwardly from the mannequin 52 thereby visually impairing the active hostile threat 54. The light 126 is electrically coupled to the processor 46 and the light 126 may include a plurality of light emitting diodes or other type of electronic light emitters that are capable of emitting light of sufficient intensity to temporarily blind the active hostile threat 54. The light 126 is mounted to the forward side 72 of outside wall 70 of the torso box 64 and the light 126 is positioned between the display 122 and the upper wall 66 of the torso box 64.

A plurality of cameras 128 is each integrated into the mannequin 52 to capture imagery of the immediate surrounds of the mannequin 52 thereby facilitating the imagery to be analyzed by the operator 20 of the mannequin 52. Each of the plurality of cameras 128 is electrically coupled to the processor 46 and each of the plurality of cameras 128 may comprise an infrared camera or the like. A first one of the plurality of cameras 130 is mounted to the forward side 72 of the outside wall 70 of the torso box 64 and the first camera 130 is positioned between the display 122 and the lower wall 68 of the torso box 64. A second one of the plurality of cameras 132 is integrated into the head 56 of the mannequin 52 at a point that is aligned with a respective one of the eyes 58 of the head 56. A sound unit 134 is integrated into the mannequin 52 to emit audible sounds and record audible sounds thereby facilitating the operator 20 to verbally communicate with the active hostile threat 54. The sound unit 134 is electrically coupled to the processor 46 and the sound unit 134 is integrated into the head 56 of the mannequin 52 at a point is aligned with the mouth 62 of the head 56. The sound unit 134 may include an electronic speaker for emitting the audible sounds and an electronic microphone for recording the audible sounds.

A power supply 136 is integrated into the housing 22 associated with the drive unit 12 and the power supply 136 is electrically coupled to the processor 46. The power supply 136 comprises a rechargeable battery 138 that is positioned within the housing 22 associated with the drive unit 12 and the rechargeable battery 138 is electrically coupled to the processor 46. The power supply 136 includes a charge port 140 that is integrated into the back side 36 of the outer wall 28 of the housing 22 associated with the drive unit 12 thereby facilitating the charge port 140 to receive a charge cord 142. The charge port 140 is electrically coupled to the rechargeable battery 138 for charging the rechargeable battery 138. Additionally, the charge port 140 may include a three prong female electrical outlet and a universal serial bus port.

A stretcher 144 is removably coupled to the mannequin 52 and the stretcher 144 can be employed for transporting an injured person 146. The stretcher 144 is comprised of a bullet resistant material thereby facilitating the stretcher 144 to be employed as a ballistic shield. The stretcher 144 includes a plurality of straps 148 which are each extendable around the torso box 64. Each of the plurality of straps 148 is matable respective straps 148 to form a closed loop for retaining the stretcher 144 on the torso box 64. Furthermore, each of the plurality of straps 148 can be positioned over the injured person 146 when the injured person 146 is laid on the stretcher 144 for securing the injured person 146 to the stretcher 144. The plurality of straps 146 may each include a coupler, such as buckle for example, for attaching respective pairs of the plurality straps 146 together.

In use, the mannequin 52 is driven to a location that is occupied by an active hostile threat 54 while the operator 20 remains at a safe distance. In this way the operator 20 can visually observe the active hostile threat 54 and the surrounding area as well as verbally communicate with the active hostile threat 54. Thus, the operator 20 can negotiate with the active hostile threat 54 in the attempt to convince the active hostile threat 54 to release hostages or to surrender. The plurality of actuators 84 can be actuated to tilt the mannequin 52 into the prone position to facilitate an injured person 146 to be laid on the stretcher 144 and subsequently transported to a safe area for medical treatment when the operator 20 has negotiated for the release of the injured person 146. In this way the injured person 146 can be removed from the dangerous location without putting emergency responders at risk. Additionally, the robotic arm 108 can be employed to manipulate an object, such as a potential explosive device for example, to facilitate the potential explosive device to be transported to a safe location for detonation.

With respect to the above description then, it is to be realized that the optimum dimensional relationships for the parts of an embodiment enabled by the disclosure, to include variations in size, materials, shape, form, function and manner of operation, device and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An active hostile threat communication device for attempting to communicate with an active hostile threat, said device comprising:
   a drive unit having a pair of tracks each being configured to urge said drive unit along a support surface, said drive unit being in remote communication with a remote control wherein said drive unit is configured to be remotely controlled by an operator;
   a mannequin being movably disposed on said drive unit wherein said mannequin is configured to be driven to the active hostile threat, said mannequin having a head being structured to have a pair of eyes and a nose and a mouth wherein said head is configured to have a human appearance;
   a plurality of actuators, each of said plurality of actuators being coupled between said drive unit and said mannequin for supporting said mannequin above said drive unit, said plurality of actuators urging said mannequin into an upright position having said mannequin being vertically oriented on said drive unit, said plurality of actuators urging said mannequin into a prone position having said mannequin being horizontally oriented on said drive unit;
   a robotic arm being movably integrated into said mannequin, said robotic arm being actuatable to move in a wide range of motions wherein said robotic arm is configured to manipulate objects;
   a light being integrated into said mannequin wherein said light is configured to emit a high intensity light outwardly from said mannequin thereby visually impairing the active hostile threat;
   a plurality of cameras, each of said plurality of cameras being integrated into said mannequin wherein each of said plurality of cameras is configured to capture imagery of the immediate surrounds of said mannequin thereby facilitating the imagery to be analyzed by the operator of said mannequin;
   a sound unit being integrated into said mannequin wherein said sound unit is configured to emit audible sounds and record audible sounds thereby facilitating the operator to verbally communicate with the active hostile threat; and
   a stretcher being removably coupled to said mannequin wherein said stretcher is configured to be employed for transporting an injured person, said stretcher being comprised of a bullet resistant material wherein said stretcher is configured to be employed as a ballistic shield, said stretcher including a plurality of straps wherein each of said plurality of straps is configured to be positioned over the injured person when the injured person is laid on said stretcher for securing the injured person to said stretcher.

2. The device according to claim 1, wherein:
   said drive unit comprises:
   a housing having a top wall and a bottom wall and an outer wall extending between said top wall and said bottom wall, said outer wall having a first lateral side and a second lateral side and a front side and a back side, said first lateral side having a first recess extending toward said second lateral side, said first recess extending between said front side and said back side, said first recess being aligned with said bottom wall, said second lateral side having a second recess extending toward said first lateral side, said second recess extending between said front side and said back side, said second recess being aligned with said bottom wall;
   a pair of drive wheels, each of said drive wheels being rotatably attached to a respective one of said first lateral side and said second lateral side of said outer wall of said housing, each of said drive wheels being positioned in a respective one of said first recess and said second recess at a point located adjacent to said back side of said outer wall; and
   a pair of free wheels, each of said free wheels being rotatably coupled to a respective one of said first lateral side and said second lateral side of said outer wall of said housing, each of said free wheels being positioned in a respective one of said first recess and said second recess at a point located adjacent to said front side of said outer wall; and
   each of said pair of tracks extends around a respective one of said drive wheels and a respective one of said free wheels.

3. The device according to claim 2, wherein said drive unit includes:
   a processor being integrated into said housing;
   a transceiver being integrated into said housing, said transceiver being electrically coupled to said processor, said transceiver being in wireless communication with the remote control thereby facilitating said transceiver to receive command signals from the remote control; and
   a pair of drive motors, each of said pair of drive motors being positioned within said housing, each of said pair of drive motors being in mechanical communication with a respective one of said drive wheels, each of said pair of drive motors being actuatable to rotate in a first direction or a second direction thereby rotating said respective drive wheel in a forward direction or a rearward direction to facilitate said pair of tracks to urge said housing along the support surface, each of pair of said drive motors being electrically coupled to said processor wherein said transceiver is configured to facilitate a user to remotely control the motion of said drive unit.

4. The device according to claim 1, wherein:
   said mannequin includes a torso box having an upper wall and a lower wall and an outside wall extending between said upper wall and said lower wall, a neck of said head being attached to said upper wall of said torso box, said outside wall having a forward side and a rear side and a first sidelong side and a second sidelong side;
   said device includes a bar being attached to said lower wall of said torso box, said bar being oriented to extend substantially between said first sidelong side and said second sidelong side of said torso box.

5. The device according to claim 4, wherein:
said drive unit includes a housing having a top wall and a bottom wall and an outer wall extending between said top wall and said bottom wall; and
each of said plurality of actuators includes a cylinder being pivotally attached to said top wall of said housing associated with said drive unit, each of said actuators including a piston being slidably integrated into said cylinder, said piston associated with each of said actuators being urgeable to retract or extend from said cylinder associated with a respective actuator;
said plurality of actuators includes a pair of side actuators and a central actuator;
a free end of said piston associated with each of said side actuators is pivotally attached to a respective one of said first sidelong side and said second sidelong side of said outside wall of said torso box at a point located closer to said upper wall than said lower wall of said torso box; and
a free end of said piston associated with said central actuator is pivotally coupled to bar on said lower wall of said torso box.

6. The device according to claim 5, wherein:
said forward side of said outside wall of said torso box is spaced from and lies on a plane being oriented parallel to said top side of said outer wall of said housing associated with said drive unit when said plurality of actuators urges said mannequin into said prone position; and
said lower wall of said torso box is spaced from and lies on a plane being oriented parallel to said top side of said housing associated with said drive unit when said plurality of actuators urges said mannequin into said upright position.

7. The device according to claim 3, further comprising a hydraulic manifold being positioned within said housing associated with said drive unit, said hydraulic manifold having a plurality of outputs, each of said outputs being fluidly coupled to a cylinder associated with a respective one of said plurality of actuators, said hydraulic manifold being electrically coupled to said processor for receiving instructional commands relating to either extending or retracting each of said plurality of actuators.

8. The device according to claim 7, further comprising a hydraulic pump being positioned within said housing associated with said drive unit, said hydraulic pump being fluidly coupled to an input of said hydraulic manifold for supplying hydraulic pressure to said hydraulic manifold, said hydraulic pump being electrically coupled to said processor for receiving instructional commands relating to supply hydraulic pressure to said hydraulic manifold.

9. The device according to claim 3, wherein:
said robotic arm includes a series of arm actuators each being integrated into a respective one of a plurality of segments of said robotic arm thereby facilitating said plurality of segments to move independently of each other;
said robotic arm includes pair of jaws each being pivotally disposed on a distal one of said plurality of segments, said pair of jaws being movable toward or away from each other wherein said pair of jaws is configured to either grip or release the objects;
said robotic arm includes a shoulder actuator being positioned within said torso box, said shoulder actuator being in mechanical communication with a shoulder of said robotic arm for rotating said shoulder;
each of said series of arm actuators is electrically coupled to said processor for receiving instructional commands from said processor with respect to motion of said robotic arm; and
said shoulder actuator is electrically coupled to said processor for receiving instructional commands from said processor with respect to motion of said shoulder.

10. The device according to claim 1, wherein:
said drive unit includes a processor;
said mannequin includes a torso box which has a lower wall and outside wall, said outside wall having a forward side;
each of said plurality of cameras is electrically coupled to said processor;
a first one of said plurality of cameras is mounted to said forward side of said outside wall of said torso box, said first camera being positioned between said display and said lower wall of said torso box; and
a second one of said plurality of cameras is integrated into said head of said mannequin at a point being aligned with a respective one of said eyes of said head.

11. The device according to claim 3, further comprising a power supply being integrated into said housing associated with said drive unit, said power supply being electrically coupled to said processor, said power supply comprising:
a rechargeable battery being positioned within said housing associated with said drive unit, said rechargeable battery being electrically coupled to said processor; and
a charge port being integrated into said back side of said outer wall of said housing associated with said drive unit thereby facilitating said charge port to receive a charge cord, said charge port being electrically coupled to said rechargeable battery for charging said rechargeable battery.

12. The device according to claim 4, wherein each of said plurality of straps on said stretcher being extendable around said torso box, each of said plurality of straps being matable to a respective strap to form a closed loop for retaining said stretcher on said torso box, wherein each of said plurality of straps is configured to be positioned over the injured person when the injured person is laid on said stretcher for securing the injured person to said stretcher.

13. An active hostile threat communication device for attempting to communicate with an active hostile threat, said device comprising:
a drive unit having a pair of tracks each being configured to urge said drive unit along a support surface, said drive unit being in remote communication with a remote control wherein said drive unit is configured to be remotely controlled by an operator, said drive unit comprising:
a housing having a top wall and a bottom wall and an outer wall extending between said top wall and said bottom wall, said outer wall having a first lateral side and a second lateral side and a front side and a back side, said first lateral side having a first recess extending toward said second lateral side, said first recess extending between said front side and said back side, said first recess being aligned with said bottom wall, said second lateral side having a second recess extending toward said first lateral side, said second recess extending between said front side and said back side, said second recess being aligned with said bottom wall;

a pair of drive wheels, each of said drive wheels being rotatably attached to a respective one of said first lateral side and said second lateral side of said outer wall of said housing, each of said drive wheels being positioned in a respective one of said first recess and said second recess at a point located adjacent to said back side of said outer wall;

a pair of free wheels, each of said free wheels being rotatably coupled to a respective one of said first lateral side and said second lateral side of said outer wall of said housing, each of said free wheels being positioned in a respective one of said first recess and said second recess at a point located adjacent to said front side of said outer wall;

wherein each of said pair of tracks extends around a respective one of said drive wheels and a respective one of said free wheels;

a processor being integrated into said housing;

a transceiver being integrated into said housing, said transceiver being electrically coupled to said processor, said transceiver being in wireless communication with the remote control thereby facilitating said transceiver to receive command signals from the remote control; and a pair of drive motors, each of said pair of drive motors being positioned within said housing, each of said pair of drive motors being in mechanical communication with a respective one of said drive wheels, each of said pair of drive motors being actuatable to rotate in a first direction or a second direction thereby rotating said respective drive wheel in a forward direction or a rearward direction to facilitate said pair of tracks to urge said housing along the support surface, each of pair of said drive motors being electrically coupled to said processor wherein said transceiver is configured to facilitate a user to remotely control the motion of said drive unit;

a mannequin being movably disposed on said drive unit wherein said mannequin is configured to be driven to the active hostile threat, said mannequin having a head being structured to have a pair of eyes and a nose and a mouth wherein said head is configured to have a human appearance, said mannequin including a torso box having an upper wall and a lower wall and an outside wall extending between said upper wall and said lower wall, a neck of said head being attached to said upper wall of said torso box, said outside wall having a forward side and a rear side and a first sidelong side and a second sidelong side;

a bar being attached to said lower wall of said torso box, said bar being oriented to extend substantially between said first sidelong side and said second sidelong side of said torso box;

a plurality of actuators, each of said plurality of actuators being coupled between said drive unit and said mannequin for supporting said mannequin above said drive unit, said plurality of actuators urging said mannequin into an upright position having said mannequin being vertically oriented on said drive unit, said plurality of actuators urging said mannequin into a prone position having said mannequin being horizontally oriented on said drive unit, each of said plurality of actuators including a cylinder being pivotally attached to said top wall of said housing associated with said drive unit, each of said actuators including a piston being slidably integrated into said cylinder, said piston associated with each of said actuators being urgeable to retract or extend from said cylinder associated with a respective actuator, said plurality of actuators including a pair of side actuators and a central actuator, a free end of said piston associated with each of said side actuators being pivotally attached to a respective one of said first sidelong side and said second sidelong side of said outside wall of said torso box at a point located closer to said upper wall than said lower wall of said torso box, a free end of said piston associated with said central actuator being pivotally coupled to bar on said lower wall of said torso box, said forward side of said outside wall of said torso box being spaced from and lying on a plane being oriented parallel to said top side of said outer wall of said housing associated with said drive unit when said plurality of actuators urges said mannequin into said prone position, said lower wall of said torso box being spaced from and lying on a plane being oriented parallel to said top side of said housing associated with said drive unit when said plurality of actuators urges said mannequin into said upright position;

a hydraulic manifold being positioned within said housing associated with said drive unit, said hydraulic manifold having a plurality of outputs, each of said outputs being fluidly coupled to said cylinder associated with a respective one of said plurality of actuators, said hydraulic manifold being electrically coupled to said processor for receiving instructional commands relating to either extending or retracting each of said plurality of actuators;

a hydraulic pump being positioned within said housing associated with said drive unit, said hydraulic pump being fluidly coupled to an input of said hydraulic manifold for supplying hydraulic pressure to said hydraulic manifold, said hydraulic pump being electrically coupled to said processor for receiving instructional commands relating to supply hydraulic pressure to said hydraulic manifold;

a robotic arm being movably integrated into said mannequin, said robotic arm being actuatable to move in a wide range of motions wherein said robotic arm is configured to manipulate objects, said robotic arm including a series of arm actuators each being integrated into a respective one of a plurality of segments of said robotic arm thereby facilitating said plurality of segments to move independently of each other, said robotic arm including pair of jaws each being pivotally disposed on a distal one of said plurality of segments, said pair of jaws being movable toward or away from each other wherein said pair of jaws is configured to either grip or release the objects, said robotic arm including a shoulder actuator being positioned within said torso box, said shoulder actuator being in mechanical communication with a shoulder of said robotic arm for rotating said shoulder, each of said series of arm actuators being electrically coupled to said processor for receiving instructional commands from said processor with respect to motion of said robotic arm, said shoulder actuator being electrically coupled to said processor for receiving instructional commands from said processor with respect to motion of said shoulder;

a display being integrated into said mannequin wherein said display is configured to be visible to the active hostile threat when said mannequin is driven to the active hostile threat, said display displaying indicia comprising words and letters defining written instructions, said display being electrically coupled to said processor, said display being positioned on said forward side of said outside wall of said torso box;
- a light being integrated into said mannequin wherein said light is configured to emit a high intensity light outwardly from said mannequin thereby visually impairing the active hostile threat, said light being electrically coupled to said processor, said light being mounted to said forward side of outside wall of said torso box, said light being positioned between said display and said upper wall of said torso box;
- a plurality of cameras, each of said plurality of cameras being integrated into said mannequin wherein each of said plurality of cameras is configured to capture imagery of the immediate surrounds of said mannequin thereby facilitating the imagery to be analyzed by the operator of said mannequin, each of said plurality of cameras being electrically coupled to said processor, a first one of said plurality of cameras being mounted to said forward side of said outside wall of said torso box, said first camera being positioned between said display and said lower wall of said torso box, a second one of said plurality of cameras being integrated into said head of said mannequin at a point being aligned with a respective one of said eyes of said head;
- a sound unit being integrated into said mannequin wherein said sound unit is configured to emit audible sounds and record audible sounds thereby facilitating the operator to verbally communicate with the active hostile threat, said sound unit being electrically coupled to said processor, said sound unit being integrated into said head of said mannequin at a point being aligned with said mouth of said head;
- a power supply being integrated into said housing associated with said drive unit, said power supply being electrically coupled to said processor, said power supply comprising:
  - a rechargeable battery being positioned within said housing associated with said drive unit, said rechargeable battery being electrically coupled to said processor; and
  - a charge port being integrated into said back side of said outer wall of said housing associated with said drive unit thereby facilitating said charge port to receive a charge cord, said charge port being electrically coupled to said rechargeable battery for charging said rechargeable battery; and
- a stretcher being removably coupled to said mannequin wherein said stretcher is configured to be employed for transporting an injured person, said stretcher being comprised of a bullet resistant material wherein said stretcher is configured to be employed as a ballistic shield, said stretcher including a plurality of straps which are each extendable around said torso box, each of said plurality of straps being matable to a respective strap to form a closed loop for retaining said stretcher on said torso box, wherein each of said plurality of straps is configured to be positioned over the injured person when the injured person is laid on said stretcher for securing the injured person to said stretcher.

* * * * *